US012714149B2

(12) United States Patent
Qi et al.

(10) Patent No.: US 12,714,149 B2
(45) Date of Patent: Aug. 25, 2026

(54) SUSCEPTOR FOR VAPOR GENERATION APPARATUS, VAPOR GENERATION APPARATUS, AND TEMPERATURE MEASUREMENT APPARATUS

(71) Applicant: SHENZHEN FIRST UNION TECHNOLOGY CO., LTD., Shenzhen City (CN)

(72) Inventors: Zuqiang Qi, Shenzhen City (CN); Jiamao Luo, Shenzhen City (CN); Tao Wu, Shenzhen City (CN); Baoling Lei, Shenzhen City (CN); Zhongli Xu, Shenzhen City (CN); Yonghai Li, Shenzhen City (CN)

(73) Assignee: SHENZHEN FIRST UNION TECHNOLOGY CO., LTD., Shenzhen City (CN)

( * ) Notice: Subject to any disclaimer, the term of this patent is extended or adjusted under 35 U.S.C. 154(b) by 525 days.

(21) Appl. No.: 18/029,357

(22) PCT Filed: Sep. 29, 2021

(86) PCT No.: PCT/CN2021/121782
§ 371 (c)(1),
(2) Date: Mar. 29, 2023

(87) PCT Pub. No.: WO2022/068890
PCT Pub. Date: Apr. 7, 2022

(65) Prior Publication Data

US 2023/0363463 A1 Nov. 16, 2023

(30) Foreign Application Priority Data

Sep. 29, 2020 (CN) ........................ 202011047354.3

(51) Int. Cl.
*A24F 40/51* (2020.01)
*A24F 40/465* (2020.01)
*H05B 6/10* (2006.01)

(52) U.S. Cl.
CPC ............ *A24F 40/51* (2020.01); *A24F 40/465* (2020.01); *H05B 6/108* (2013.01)

(58) Field of Classification Search
None
See application file for complete search history.

(56) References Cited

U.S. PATENT DOCUMENTS 8,353,627 B2 1/2013 Dotti et al.
2010/0101553 A1 4/2010 Dotti et al.

FOREIGN PATENT DOCUMENTS

CN 105806504 A 7/2016
CN 108414106 A 8/2018

(Continued)

*Primary Examiner* — Phu H Nguyen
(74) *Attorney, Agent, or Firm* — Scully, Scott, Murphy & Presser, P.C.

(57) ABSTRACT

This application provides a vapor generation apparatus, a susceptor for a vapor generation apparatus, and a temperature measurement apparatus. The vapor generation apparatus includes: a chamber, a magnetic field generator, and a susceptor. The susceptor includes a sensing part, constructed to at least partially extend in the chamber and including a hollow extending along an axial direction; and a metal base body, located in the hollow of the sensing part and abutting against the sensing part, where a first metal material and a second metal material are connected to the metal base body, and the first metal material and the second metal material are made of different materials, to cause a thermocouple configured to sense a temperature of the sensing part to be formed between the first metal material and the second metal material.

15 Claims, 4 Drawing Sheets

(56) References Cited

FOREIGN PATENT DOCUMENTS

| | | | |
|---|---|---|---|
| CN | 110169594 | A | 8/2019 |
| CN | 110477461 | A | 11/2019 |
| CN | 110810930 | A | 2/2020 |
| CN | 111418910 | A | 7/2020 |
| CN | 211153806 | U | 8/2020 |
| CN | 111902060 | A | 11/2020 |
| CN | 212464914 | U | 2/2021 |
| EP | 2180253 | A1 | 4/2010 |
| EP | 4159056 | A1 | 4/2023 |
| TW | 202037294 | A | 10/2020 |
| WO | 2019/021119 | A1 | 1/2019 |

SUSCEPTOR FOR VAPOR GENERATION APPARATUS, VAPOR GENERATION APPARATUS, AND TEMPERATURE MEASUREMENT APPARATUS

CROSS-REFERENCE TO RELATED APPLICATIONS

This application is a 35 U.S.C. § 371 National Phase conversion of International (PCT) Patent Application No. PCT/CN2021/121782, filed on Sep. 29, 2021, which claims priority to Chinese Patent Application No. 202011047354.3, filed with the China National Intellectual Property Administration on Sep. 29, 2020 and entitled "SUSCEPTOR FOR VAPOR GENERATION APPARATUS, VAPOR GENERATION APPARATUS, AND TEMPERATURE MEASUREMENT APPARATUS", which is incorporated herein by reference in its entirety. The PCT International Patent Application was filed and published in Chinese.

TECHNICAL FIELD

Embodiments of this application relate to the field of heat-not-burn cigarette devices of an electromagnetic induction type, and in particular, to a susceptor for a vapor generation apparatus, a vapor generation apparatus, and a temperature measurement apparatus.

BACKGROUND

Tobacco products (such as cigarettes and cigars) burn tobacco during use to produce tobacco smoke. Attempts are made to replace these tobacco-burning products by manufacturing products that release compounds without burning.

An example of such a product is a heating apparatus that releases compounds by heating rather than burning materials. For example, the materials may be tobacco or other non-tobacco products. These non-tobacco products may or may not include nicotine. In a known apparatus, temperature monitoring is required in a process of heating a tobacco product. In an example, such a product is attached to a heating component through a temperature sensor, to obtain a temperature of the heating component.

SUMMARY

An embodiment of this application provides a vapor generation apparatus, configured to heat an aerosol-forming article to generate an aerosol, and including:

a chamber, configured to receive at least a part of the aerosol-forming article;

a magnetic field generator, configured to generate a variable magnetic field; and a susceptor, configured to be penetrated by the variable magnetic field to generate heat, to heat the aerosol-forming article, where the susceptor includes:

a sensing part, constructed to at least partially extend in the chamber and including a hollow extending along an axial direction; and a metal base body, located in the hollow of the sensing part and abutting against the sensing part, where a first metal material and a second metal material are connected to the metal base body, and the first metal material and the second metal material are made of different materials, to cause a thermocouple configured to sense a temperature of the sensing part to be formed between the first metal material and the second metal material.

In a preferred implementation, the metal base body is substantially constructed to be coaxial with the sensing part and in a shape of a sheet or a column.

In a preferred implementation, the susceptor further includes:

a support member, located in the hollow of the sensing part and providing support for the metal base body, to cause the metal base body to abut against the sensing part.

In a preferred implementation, the sensing part includes a pointed end configured to be inserted into the aerosol-forming article and a far end facing away from the pointed end; and the metal base body includes a first surface close to the pointed end along the axial direction and a second surface facing away from the first surface; and the support member supports the metal base body on the second surface, to cause the first surface to abut against the sensing part.

In a preferred implementation, the second surface is a flat surface extending along a cross-sectional direction of the susceptor.

In a preferred implementation, the sensing part includes a pointed end configured to be inserted into the aerosol-forming article; and the metal base body includes a first surface close to the pointed end along the axial direction, where the first surface is a flat surface extending along the cross-sectional direction of the susceptor.

In a preferred implementation, the first metal material and/or the second metal material run through the metal base body along the axial direction.

In a preferred implementation, the first metal material and/or the second metal material are connected to the first surface of the metal base body.

In a preferred implementation, the first metal material and/or the second metal material do not protrude from the first surface of the metal base body.

In a preferred implementation, the support member is constructed to be coaxial with the sensing part and in a shape of a column or a tube.

In a preferred implementation, a first through hole and a second through hole that are arranged along the axial direction of the susceptor are provided on the support member; and the first metal material at least partially extends in the first through hole, and the second metal material at least partially extends in the second through hole.

In a preferred implementation, a base part extending to the outside along a radial direction is further arranged in the sensing part, and the susceptor is held in the vapor generation apparatus through the base part.

In a preferred implementation, the first metal material and/or the second metal material are constructed to be in shapes of elongated filaments and at least partially run through the sensing part.

In a preferred implementation, the sensing part and the metal base body are made of the same material.

An embodiment of this application further provides a susceptor for a vapor generation apparatus, including: a sensing part, constructed to include a hollow extending along a length direction of the susceptor; and a metal base body, located in the hollow of the sensing part and abutting against the sensing part, where a first metal material and a second metal material are connected to the metal base body, and the first metal material and the second metal material are made of different materials, to cause a thermocouple configured to sense a temperature of the sensing part to be formed between the first metal material and the second metal material.

An embodiment of this application further provides a temperature measurement apparatus, including a metal base body, where a first metal material and a second metal material are connected to the metal base body, and the first metal material and the second metal material are made of different materials, to cause a thermocouple configured to sense a temperature to be formed between the first metal material and the second metal material.

In the foregoing vapor generation apparatus and susceptor, a thermocouple that can be configured to measure a temperature is formed by simultaneously connecting the first metal material and the second metal material that are made of different materials to the metal base body, thereby achieving a more accurate temperature measurement effect.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding of this application, this application is described in further detail below with reference to the accompanying drawings and specific implementations.

Figure 1:
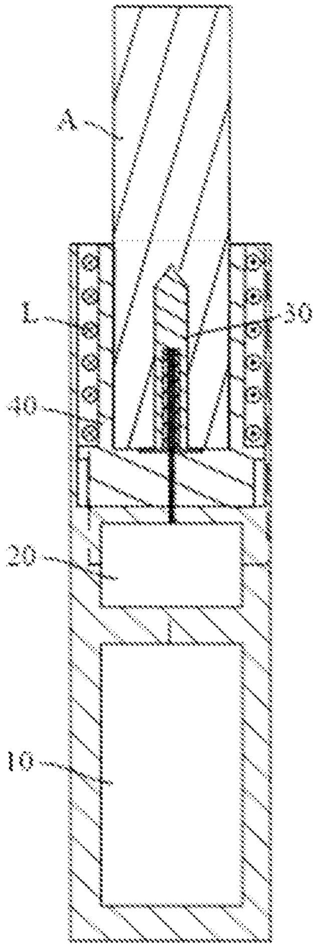
FIG. 1 is a schematic structural diagram of a vapor generation apparatus according to an embodiment.

An embodiment of this application provides a vapor generation apparatus and a structure thereof may refer to FIG. 1. The apparatus includes:

- a chamber, where an aerosol-forming article A is removably received in the chamber;
- an induction coil L, configured to generate a variable magnetic field under an alternating current;
- a susceptor 30, at least partially extending in the chamber, and configured to be inductively coupled to the induction coil L and be penetrated by the variable magnetic field to generate heat, to heat the aerosol-forming article A such as a cigarette, so that at least one component of the aerosol-forming article A is evaporated, thereby forming an aerosol for inhaling;
- a cell 10, being a rechargeable direct-current cell and capable of outputting a direct current; and
- a circuit 20, being connected to the rechargeable cell 10 through a suitable current, and configured to convert the direct current outputted by the cell 10 into an alternating current with a suitable frequency and then supply the alternating current to the induction coil L.

According to settings during use of a product, the induction coil L may be a cylindrical induction coil wound into a helical shape, as shown in FIG. 1. A radius r of the cylindrical induction coil L wound into the helical shape may range from about 5 mm to about 10 mm, and particularly, the radius r may be about 7 mm. A length of the cylindrical induction coil L wound into the helical shape may range from about 8 mm to about 14 mm, and a quantity of turns of the induction coil L ranges from 8 to 15. Correspondingly, an inner volume may range from about 0.15 $cm^3$ to about 1.10 $cm^3$.

In a more preferred implementation, the frequency of the alternating current supplied by the circuit 20 to the induction coil L ranges from 80 KHz to 400 KHz; and more specifically, the frequency may range from about 200 KHz to 300 KHz.

In a preferred embodiment, a direct-current supply voltage provided by the cell 10 ranges from about 2.5 V to about 9.0 V, and an amperage of the direct current that the cell 10 can provide ranges from about 2.5 A to about 20 A.

In a preferred embodiment, the susceptor 30 is substantially in a shape of a pin or a blade, which is beneficial for the susceptor to be inserted into the aerosol-forming article A. In addition, the susceptor 30 may be defined with a length of about 12 mm, a width of about 4 mm, and a thickness of about 0.5 mm, and may be made of stainless steel of level 430 (SS430). As an alternative embodiment, the susceptor 30 may be defined with a length of about 12 mm, a width of about 5 mm, and a thickness of about 0.5 mm, and may be made of stainless steel of level 430 (SS430). In other variant embodiments, the susceptor 30 may alternatively be constructed to be in a shape of a cylinder. During use, an internal space of the susceptor is used for receiving the aerosol-forming article A and generating the aerosol for inhaling in a manner of heating an outer periphery of the aerosol-forming article A. These susceptors may also be made of stainless steel of level 420 (SS420) and alloy materials (such as permalloy) containing iron and nickel.

In the embodiment shown in FIG. 1, the vapor generation apparatus further includes a holder 40 configured to arrange the induction coil L and the susceptor 30. The holder 40 may be made of a high-temperature-resistant non-metal material such as PEEK, ceramic, or the like. In an implementation, the induction coil L is fixed by winding around an outer wall of the holder 40. In addition, as shown in FIG. 1, a hollow of the holder 40 is in a shape of a tube, and the chamber configured to receive the aerosol-forming article A is formed in a part of a space of the tubular hollow.

Figure 2:
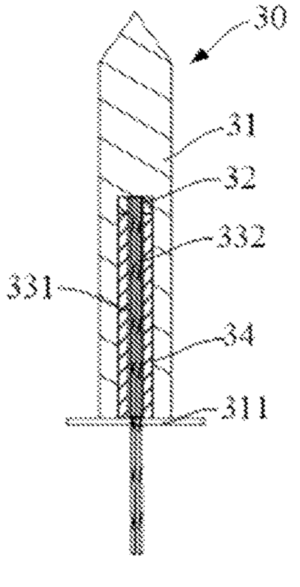
FIG. 2 is a schematic cross-sectional structural diagram of a susceptor in FIG. 1.
Figure 3:
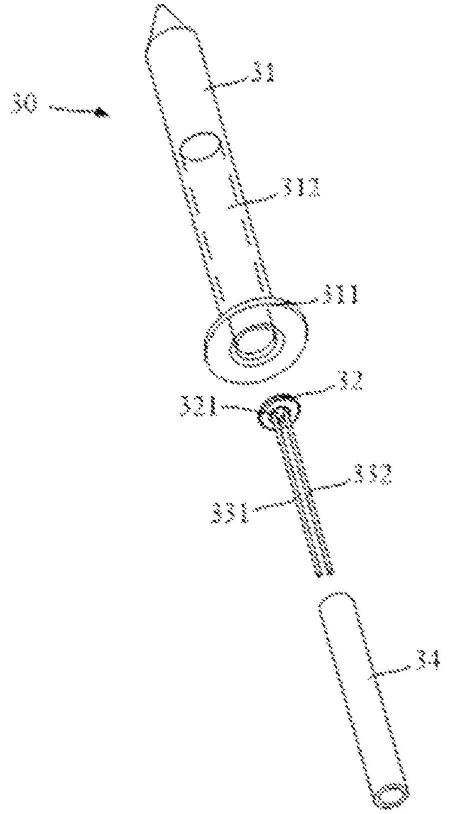
FIG. 3 is a schematic exploded view of various parts of the susceptor in FIG. 2 before assembly.

In a preferred implementation, to accurately monitor a temperature of the susceptor 30, a detailed structure of the susceptor 30 is shown in FIG. 2 and FIG. 3. The susceptor includes:

a sensing part 31, constructed to include a hollow 312 and in a shape of a pin, and configured to be penetrated by the variable magnetic field to generate heat, where an external diameter of the sensing part may generally range from about 1.5 mm to about 3 mm, and the hollow 312 forms an opening at a lower end of the sensing part 31. In an implementation, an extension length of the hollow 312 in the sensing part 31 approximately ranges from one-half to two-thirds of a length of the sensing part 31. An internal diameter of the hollow 312 ranges from 1.0 mm to 2.0 mm, and preferably ranges from 1.2 mm to 1.8 mm.

In an optional implementation, the sensing part 31 is prepared by using the sensing metal material described above. In a variable implementation, the sensing part 31 is obtained by forming a sensing material coating through electroplating, deposition, and the like on an outer surface of a heat-resistant base material such as ceramic that is in a shape of a pin or in a shape similar to the pin.

The hollow 312 of the sensing part 31 is arranged with:

a metal base body 32, being substantially in a shape of a ring and being coaxially positioned in the hollow 312 of the sensing part 31, where a first metal material 331 and a second metal material 332 are connected to the metal base body 32 in a welding manner or the like. In the implementation, the first metal material 331 and the second metal material 332 are made of different galvanic materials and are in shapes of elongated filaments or pins, so that a thermocouple configured to measure a temperature can be formed between the first metal material 331 and the second metal material 332 through the metal base body 32. In an optional implementation, the first metal material 331 and the second metal material 332 are respectively used as a positive electrode and a negative electrode of the thermocouple, where the positive electrode may be made of a nickel-chromium alloy wire and the negative electrode may be made of a nickel-silicon alloy wire, to form a K-type thermocouple.

Figure 4:
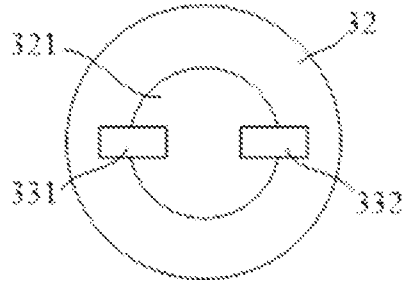
FIG. 4 is a schematic diagram of welding a first metal material and a second metal material to an upper surface of the metal base body.

According to the preferred implementations shown in FIG. 3 and FIG. 4, the first metal material 331 and the second metal material 332 are welded to a surface of the metal base body after running through an annular middle hole 321 of the metal base body 32, thereby forming the thermocouple configured to measure the temperature between the first metal material and the second metal material. In an optional implementation, welding may be performed in a manner of laser welding, resistance welding, argon arc welding, or the like.

Further, in a preferred implementation, the metal base body 32 is prepared by using a material the same as that of the sensing part 31. In addition, a thickness of the metal base body 32 preferably ranges from 1 mm to 2 mm, so that the metal base body is substantially constructed to be in a shape of a relatively small sheet or a thin sheet. Therefore, heat can be transferred more quickly between the metal base body and the sensing part 31, thereby sensing a temperature of a high-temperature region of the sensing part 31 more accurately. In an optional implementation, the thickness of the metal base body may be increased, so that the metal base body is coaxial with the sensing part and in a shape of a column.

To enable the thermocouple configured to measure the temperature and formed by using the metal base body 32, the first metal material 331, and the second metal material 332 to detect the temperature of the sensing part 31 conveniently and accurately and to be arranged in the sensing part 31 stably, the susceptor 30 further includes:

a tubular support member 34, where an upper end of the tubular support member is configured to support the metal base body 32, so that the metal base body can be stably held on or abut against a top inner wall of the hollow 312 of the sensing part 31.

Further, the tubular support member 34 is made of temperature-resistant ceramic such as zirconia ceramic, alumina ceramic, PEEK, or the like. After being assembled into the hollow 312 of the sensing part 31, the tubular support member 34 is connected and fixed to the sensing part 31 by applying ceramic glue to a gap between the tubular support member and the hollow or arranging a mechanical connection structure such as screw threads or a buckle. In an optional implementation, an external diameter of the tubular support member 34 ranges from 1.0 mm to 2.0 mm, slightly less than the internal diameter of the hollow 312 of the sensing part 31, to enable the tubular support member to be inserted into the hollow. The external diameter of the tubular support member preferably ranges from 1.2 mm to 1.8 mm. A diameter of the ceramic rod is less than a diameter of a center hole of an electromagnetic heating rod, to enable a ceramic rod core to be inserted into the center core of the heating rod. An internal diameter of the annular middle hole 321 of the tubular support member 34 ranges from 0.5 mm to 1.2 mm and preferably ranges from 0.6 mm to 1.0 mm, to enable the first metal material 331 and the second metal material 332 to run through the annular middle hole.

Further, in a preferred implementation, a base part 311 extending to the outside along the radial direction is further arranged at the lower end of the sensing part 31. The susceptor 30 can be supported and fixed through the base part 311, so that the susceptor is stably held in the vapor generation apparatus.

Figure 5:
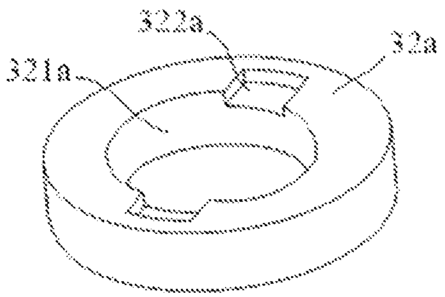
FIG. 5 is a schematic structural diagram of a metal base body according to another embodiment.

Further, in a more preferred implementation, as shown in FIG. 5, to maintain flatness of a surface of the thermocouple formed to measure the temperature, so that the thermocouple can stably abuts against the inner wall of the hollow 312 of the sensing part 31, a groove **322*a* configured to accommodate and weld the first metal material 331 and the second metal material 332 is provided on an upper surface of a metal base body 32*a*, where the groove may be formed in a manner of etching, machining, or the like. In the implementation, the first metal material 331 and the second metal material 332 are welded in the groove 322*a* after running through a middle hole 321*a* from a lower side of the metal base body 32*a*. In this way, after preparation, the first metal material 331 and the second metal material 332 do not protrude from the surface of the metal base body 32*a*, and therefore, the surface of the metal base body can still be a flat surface, thereby enabling the sensing part 31 to be attached to the inner wall of the hollow 312**.

In the preferred implementation shown in the figure, cross sections of the hollow 312 of the sensing part 31, the metal base body 32/**32*a*, and the tubular support member 34** are in shapes of circles, and may also be in shapes of triangles, squares or polygons in other optional implementations.

Figure 6:
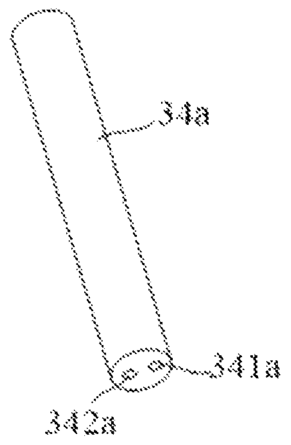
FIG. 6 is a schematic diagram of a tubular support member provided with two through holes according to another embodiment.

Surfaces of the first metal material 331 and the second metal material 332 are sprayed with insulating material layers such as polyimide, to cause the first metal material and the second metal material to be insulated from each other. Alternatively, FIG. 6 is a schematic structural diagram of a tubular support member **34*a* configured to help assemble the first metal material and the second metal material and promote the first metal material and the second metal material to be insulated from each other when the insulating material layers are not sprayed. A first through hole 341*a* and a second through hole 342*a* that extend along an axial direction are provided in the tubular support member 34*a*. During assembly, the first metal material 331 runs through the first through hole 341*a*, and the second metal material runs through the second through hole 342*a*. Therefore, the first metal material 331 and the second metal material 332 are respectively held by the first through hole 341*a* and the second through hole 342*a***, and are separated and insulated from each other while being fixed and assembled.

Based on the same or similar implementation, the metal base body 32/**32*a* may further be constructed to include two holes respectively for the first metal material 331 and the second metal material 332** to run through.

In the foregoing vapor generation apparatus and susceptor, a thermocouple that can be configured to measure a temperature is formed by simultaneously connecting the first metal material and the second metal material that are made of different materials to the metal base body, thereby achieving a more accurate temperature measurement effect and enabling production and preparation to be more convenient.

An embodiment of this application further provides a temperature measurement apparatus that may be configured to measure a temperature, and a structure thereof is shown in FIG. 3 to FIG. 4. The temperature measurement apparatus may include a metal base body 32 that can be constructed to be in a shape of a sheet, a ring, or a column. By connecting a first metal material 331 and a second metal material 332 that are made of different materials to the metal base body 32 in a manner of welding or the like, a thermocouple that is capable of measuring a temperature can be formed between the first metal material and the second metal material. In an optional implementation, each of the first metal material 331 and the second metal material 332 is made of a galvanic material such as iron, nickel-chromium alloy, nickel-silicon alloy, nickel-chromium-copper, constant bronze, or iron-chromium alloy.

It should be noted that, the specification of this application and the accompanying drawings thereof illustrate preferred embodiments of the present invention, but this application is not limited to the embodiments described in the specification. Further, a person of ordinary skill in the art may make improvements or variations according to the foregoing description, and such improvements and variations shall all fall within the protection scope of the appended claims of the present invention.

What is claimed is:

1. A vapor generation apparatus, configured to heat an aerosol-forming article to generate an aerosol, and comprising:

a chamber disposed in the vapor generation apparatus, and configured to receive the aerosol-forming article along an axial direction of the vapor generation apparatus;

a magnetic field generator disposed to surround the chamber, and configured to generate a variable magnetic field in the chamber; and a susceptor extending in the chamber, and configured to be penetrated by the variable magnetic field to generate heat to heat the aerosol-forming article when the aerosol-forming article is received in the chamber, wherein the susceptor comprises:

a sensing part, constructed to at least partially extend in the chamber and to be penetrated by the variable magnetic field to generate heat for the susceptor, and comprising a hollow extending therein along the axial direction; and a metal base body, located in the hollow of the sensing part and abutting against the sensing part, the metal base body comprising an annular middle hole extending through the metal base body, wherein a first metal material and a second metal material are respectively connected to the metal base body at edges of the annular middle hole, and the first metal material and the second metal material are made of different materials, to cause a thermocouple configured to sense a temperature of the sensing part to be formed between the first metal material and the second metal material.

2. The vapor generation apparatus according to claim 1, wherein the metal base body is constructed to be coaxial with the sensing part via extending along the axial direction and is in a shape of a sheet, a column, or a ring.

3. The vapor generation apparatus according to claim 1, wherein the susceptor further comprises:

a support member, located in the hollow of the sensing part and engaging with a part of the metal base body surrounding the annular middle hole to provide support for the metal base body in order to cause the metal base body to abut against the sensing part.

4. The vapor generation apparatus according to claim 3, wherein the sensing part comprises a pointed end configured to be inserted into the aerosol-forming article and a far end facing away from the pointed end; and the metal base body comprises a first surface close to the pointed end along the axial direction and a second surface facing away from the first surface; the annular middle hole extends from the first surface to the second surface along the axial direction, and the support member engages against the metal base body on the second surface, to cause the first surface to abut against the sensing part.

5. The vapor generation apparatus according to claim 4, wherein the second surface is a flat surface extending along a cross-sectional direction of the susceptor.

6. The vapor generation apparatus according to claim 4, wherein the first metal material and/or the second metal material extend through the metal base body along the axial direction.

7. The vapor generation apparatus according to claim 4, wherein the first metal material and/or the second metal material are connected to the first surface of the metal base body.

8. The vapor generation apparatus according to claim 4, wherein the first metal material and/or the second metal material do not protrude from the first surface of the metal base body.

9. The vapor generation apparatus according to claim 3, wherein the support member is constructed to be coaxial with the sensing part via extending along the axial direction and is in a shape of a column or a tube.

10. The vapor generation apparatus according to claim 3, wherein a first through hole and a second through hole that are respectively arranged along the axial direction are provided on the support member; and the first metal material at least partially extends in the first through hole, and the second metal material at least partially extends in the second through hole.

11. The vapor generation apparatus according to claim 1, wherein the sensing part comprises a pointed end configured to be inserted into the aerosol-forming article; and the metal base body comprises a first surface close to the pointed end along the axial direction, wherein:

the first surface is a flat surface extending along a cross-sectional direction of the susceptor.

12. The vapor generation apparatus according to claim 1, wherein a base part extending away from the susceptor along a radial direction of the susceptor perpendicular to the axial direction is further arranged in the sensing part, and the susceptor is held in the vapor generation apparatus through the base part.

13. The vapor generation apparatus according to claim 1, wherein the first metal material and/or the second metal material are constructed to be in shapes of elongated filaments and at least partially extend through the sensing part.

14. The vapor generation apparatus according to claim 1, wherein the sensing part and the metal base body are made of the same material.

15. The vapor generation apparatus according to claim 1, wherein at least one part of the first metal material and at least one part of the second metal material are respectively abutted between the metal base body and the sensing part.

* * * * *